United States Patent [19]

Janiszewski

[11] Patent Number: 5,168,773
[45] Date of Patent: Dec. 8, 1992

[54] FLYWHEEL DEVICE FOR AN INTERNAL COMBUSTION ENGINE

[75] Inventor: Grzegorz Janiszewski, Angered, Sweden

[73] Assignee: AB Volvo, Gothenburg, Sweden

[21] Appl. No.: 584,243

[22] Filed: Sep. 18, 1990

[30] Foreign Application Priority Data

Sep. 20, 1989 [SE] Sweden ............................ 8903092

[51] Int. Cl.⁵ .......................... F16F 15/12; F16D 3/14
[52] U.S. Cl. ........................................ 74/574; 74/572; 192/106.1; 464/68
[58] Field of Search ................ 74/572, 574; 192/106.1, 192/106.2; 464/63, 66, 68

[56] References Cited

U.S. PATENT DOCUMENTS

| | | | |
|---|---|---|---|
| 1,753,365 | 4/1930 | Daukus | 464/68 |
| 4,493,673 | 1/1985 | Anders et al. | 74/574 X |
| 4,790,792 | 12/1988 | Bopp | 192/106.1 |
| 4,813,295 | 3/1989 | Drexl et al. | 74/572 |
| 4,816,006 | 3/1989 | Friedmann | 74/574 |
| 4,820,239 | 4/1989 | Despres et al. | 464/68 |
| 4,944,712 | 7/1990 | Worner et al. | 74/574 |
| 4,961,487 | 10/1990 | Langeneckert | 74/574 |
| 4,983,142 | 1/1991 | Despres et al. | 74/574 |
| 4,987,980 | 1/1991 | Fujimoto | 192/106.2 |

FOREIGN PATENT DOCUMENTS

| | | |
|---|---|---|
| 0294048 | 12/1988 | European Pat. Off. . |
| 3831010 | 3/1989 | Fed. Rep. of Germany . |
| 2160296 | 12/1985 | United Kingdom . |
| 2194021 | 2/1988 | United Kingdom . |
| 2214610 | 9/1989 | United Kingdom . |

Primary Examiner—David A. Scherbel
Assistant Examiner—Winnie Yip
Attorney, Agent, or Firm—Young & Thompson

[57] ABSTRACT

A flywheel device for internal combustion engines. The device has a first flywheel mass (1) intended to be connected to the engine crankshaft, and a second mass (2) with a frictional surface (12) designed to carry a clutch cover with associated pressure plate. Torque is transmitted between the masses via springs (40) laid in channels (17) and fingers (5,6,18). The masses are cast pieces and the fingers are cast in one piece therewith and have turned lateral surfaces (5a,6a,18a,18b).

10 Claims, 5 Drawing Sheets

FLYWHEEL DEVICE FOR AN INTERNAL COMBUSTION ENGINE

FIELD OF THE INVENTION

The present invention relates to a flywheel device for internal combustion engines, comprising a first flywheel mass intended to be connected to an output shaft from the engine, a second flywheel mass intended to be coupled via a friction clutch to an input shaft of a transmission, and spring means acting between said masses for transmitting torques between said masses.

BACKGROUND OF THE INVENTION

In designing the drive train for a passenger car with a manual transmission, in recent years greater attention has been paid to the problem of damping transmission noise such as rapping at idle and rattle. Rapping at idle occurs when the car is stationary and the engine is idling, while rattle occurs when the car is driven and the drive train is loaded. Both are caused by the fact that the harmonic torque of the engine gives rise to a torsional oscillation cycle in the gearbox when the primary shaft of the gearbox is subjected to an angular acceleration by the primary shaft gear and its input shaft is then retarded by the engine and by the drag torque of the gearbox.

A known method of dampening rapping at idle and rattle is to reduce these torsional oscillations by dividing the engine flywheel into two masses with an intermediate torque transmitting spring and damping system. Such a system replaces the spring and damping device arranged in the disc center of a conventional clutch. The double mass flywheel with an intermediate spring system functions as a mechanical "low pass filter" and by suitable dimensioning of the components it can reduce the natural frequency of the torsional oscillations from 40-70 Hz, corresponding to the rpm range at which the engine operates under normal conditions, to about 15 Hz, which lies below the normal idle rpm of the engine.

OBJECT OF THE INVENTION

The purpose of the present invention is to provide a two-mass flywheel of the type described which can be produced from relatively few components using simple and inexpensive manufacturing methods.

SUMMARY OF THE INVENTION

This is achieved according to the invention in a flywheel device of the type described by way of introduction by virtue of the fact that the masses delimit together at least one cavity curved in a circular arc in the direction of rotation, in which cavity helical springs are disposed, and that the masses are made with abutments projecting into the cavity, which abutments, in the torque-unloaded state of the masses, form supports for the ends of helical spring means lying on either side of the abutments and which, when there is torque-loading with a relative rotation between the masses, are displaced in opposite directions to each compress one of said spring means.

The two masses, forming the main components of a two-mass flywheel, can consist of a pair of cast discs. By providing said discs during casting with facing circular depressions with fingers or projections extending from the bottom of said depressions in each disc, simple turning operations then suffice to finish both the cavity for the helical spring means and the abutments forming supports for the ends of the helical spring means.

BRIEF DESCRIPTION OF THE DRAWINGS

The invention will be described in more detail below with reference to an example shown in the accompanying drawings, wherein.

DETAILED DESCRIPTION OF THE INVENTION

Figure 1:
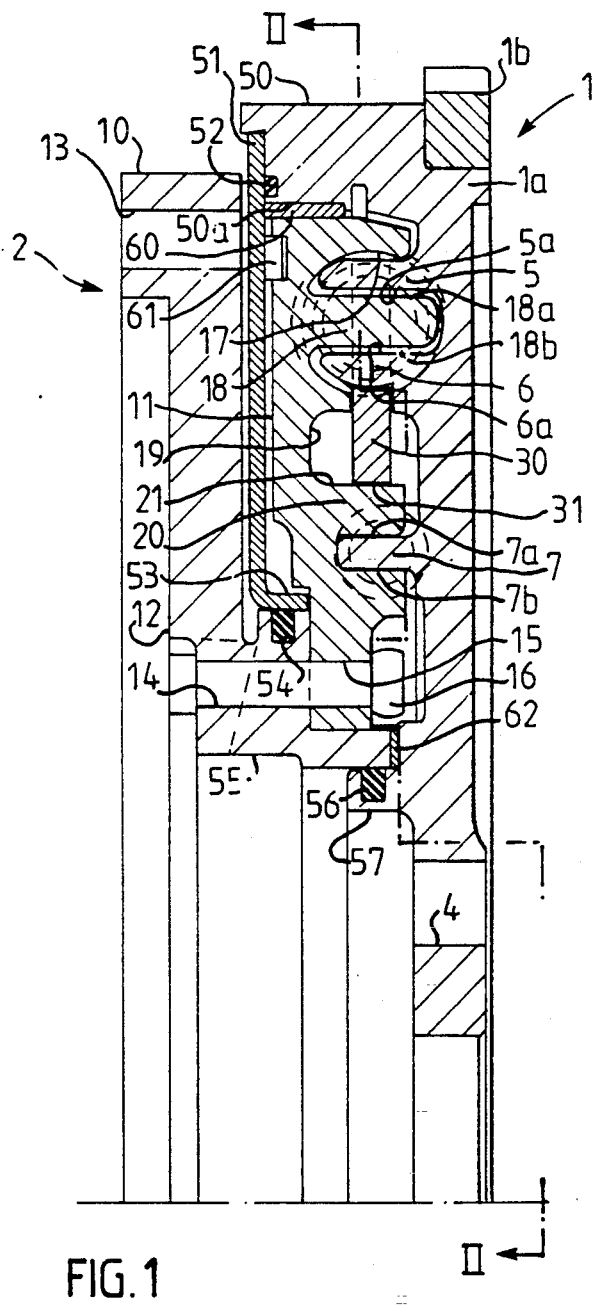
FIG. 1 shows a longitudinal section through a first embodiment of a flywheel device according to the invention.

The flywheel device consists of two separate masses, 1 and 2, which are rotatable relative to each other.

The mass 1 is made up of a cast and turned metal disc 1a with a shrunk-on gear rim 1b which is the engine's start rim. A disc 1a is designed to be screwed on to a flange (not shown) on the engine crank shaft end, and for this purpose it has mounting screw holes 4 spaced along a circle. Four pairs of fingers 5 and 6 are spaced at 90° angles, cast in one piece with the disc 1a, said fingers having facing machined surfaces 5a,6a. Radially inside the fingers 5,6 there is a pair of additional fingers 7, placed diametrically opposite to each other. The radially inner fingers 7 are also cast in one piece with the plate 1a, and they have turned outer surfaces 7a,7b.

The mass 2 consists of a first cast and turned annular metal disc 10, forming a friction plate for a clutch, and a second cast and turned metal ring 11, forming a spring holder. The disc has a faced friction surface 12 for the clutch disc (not shown) and is provided in the vicinity of its periphery with screw holes 13 spaced along a circle, by means of which a clutch cover (not shown) with a pressure plate is securely screwed to the disc 10. In the vicinity of its inner periphery the disc 10 has holes 14 spaced along a circle.

The ring 11 has corresponding holes 15 and is fixed to the disc 10 by means of rivets 16 in the holes 14,15. The ring 11 is cast with a circular, essentially U-shaped channel 17, and with four fingers 18 projecting from the bottom of the channel, said fingers being displaced 90° from each other and oriented relative to the fingers 5,6 of the mass 1 so that each of said fingers 18 in a certain relative position of the masses 1 and 2, lies between an individual pair of fingers 5,6. The surface portion 17a,17b of the channel 17 on either side of the fingers 18 are turned as are the lateral surfaces 18a,18b of the fingers 18. The ring 11 is also cast with a circular channel 19 radially inside the channel 17. The portion 20 of the ring 11 radially inside the channel 19 forms a shoulder with a turned circular surface 21, serving as a bearing surface for the ring 30.

When casting the ring 11 of the second mass 2, there are created as well circular arcuate depressions 22 with an essentially U-shaped cross section and arranged in pairs. Between the depressions 22 in each pair there are circular-arcuate slots 23, into which the inner fingers 7 of the first mass 1 extend.

Figure 2:
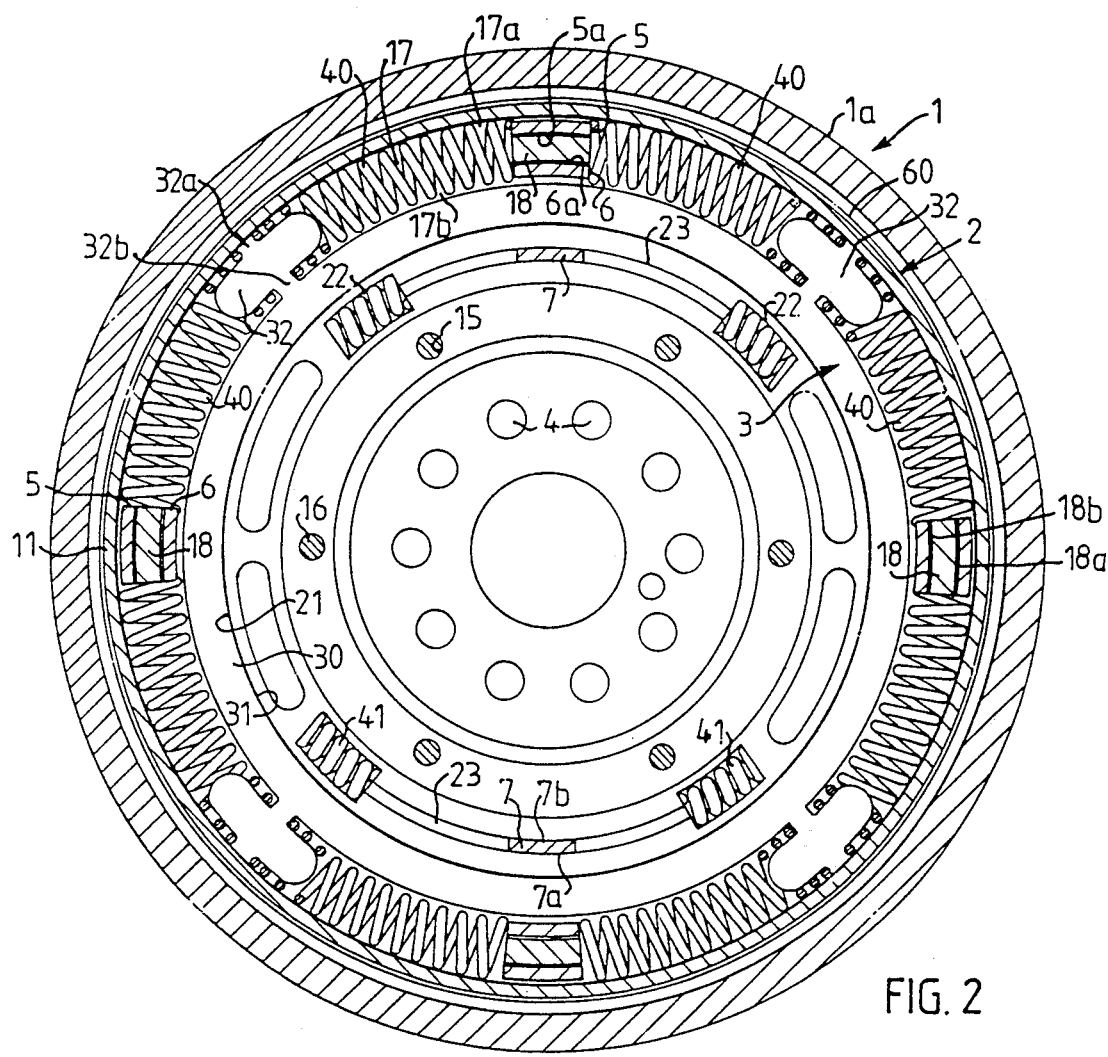
FIG. 2 shows a cross section along the line II—II in FIG. 1.

The ring 30 is a relatively thin metal ring, which can be stamped or cut and has a radially inner surface 31 which forms a bearing surface and rests against the surface 21 of the ring 11. The ring 30 is made in one piece with four oblong projections 32 evenly spaced about the periphery and which lie in the channel 17 of the ring 11. These projections have radially outer and inner abutments 32a,32b for one end of helical springs 40 lying in the channel 17. The other end of each spring abuts against the fingers 5,6 and 18, respectively, of the masses 1 and 2, respectively. As can be seen in FIG. 2, the projections 32 are shaped and arranged so that the opposite ends of each projection extend into opposing spring ends, so that when the flywheel device is not subjected to torque, the projections 32 lie midway between pairs of adjacent groups of fingers 5,6 and 18, as shown in FIG. 2. In each channel portion 17 between two groups of fingers, there lie, in the example shown, two helical springs 40, which are held together by the ring 30 serving as a spring guide or holder.

The disc 1a of the mass 1 is made with depressions (not shown) which supplement the channel 17 and the depressions 22 in such a way that essentially closed cavities are formed, essentially circular in cross section for the springs 40 and the springs 41. The purpose of the latter is, by cooperation with the inner fingers 7, to damp impact when there is an extreme overloading of the system. The cavities defined by the disc 1a and the ring 11 are filled with a medium having lubricating and damping properties. The disc 1a is machined so that a flange 50 is formed which extends axially over the ring 11. A cover plate 51 is fixed to the end of said flange 50 with a seal 52 therebetween. The cover plate 51 has an inner flange 53 abutting against a seal 54 in a groove in a flange portion 55 of the disc 10. A further seal 56 in a groove in a radially inner flange 57 on the disc 1a completes the sealing-off of the cavities with respect to the surroundings.

Between the inner surface 50a of the flange 50 and an opposing radial surface of the ring 11, there is a radial bearing 60 in the form of a teflon ring for example. Axial forces in the system are taken up by a thrust-bearing 61 between the cover plate 51 and the ring 11 and a more central thrust-bearing 62 between the disc 1a and an end surface on the flange portion 55 of the disc 10.

As is evident from the above description, no other machining is required than turning and drilling in order to finish the flywheel discs 1a and 10 and the ring 11. Since the side surfaces 5a,6a;18a,18b of the projections 5,6;18 are machined in a lathe; there is provided an automatic fitting to the curvature of the cavity 17 as is required in order to have a minimum of play between the surfaces 5a,6a and 18a,18b and still assure free displacement of the fingers 5,6 relative to finger 18 when there is a relative rotation between the masses. That area of depression 17 in the ring 11 lying within those circles constituting the lateral limits of the fingers 18 cannot, for obvious reasons, be machined in a lathe. The same is true for the corresponding areas of the ring 1a, lying within circles constituting the lateral limits of the fingers 5 and 6. It has, however, been demonstrated that the desired functioning as regards low resistance to spring movement is achieved with or with only partial turning of the spring cavities. The most important feature is that the described design with one central and two lateral fingers 5,6 and 18 provides for a symmetrical loading of the springs when compressed, thus avoiding oblique loading with consequent pressing of the springs against the side walls of the cavity.

Figure 3:
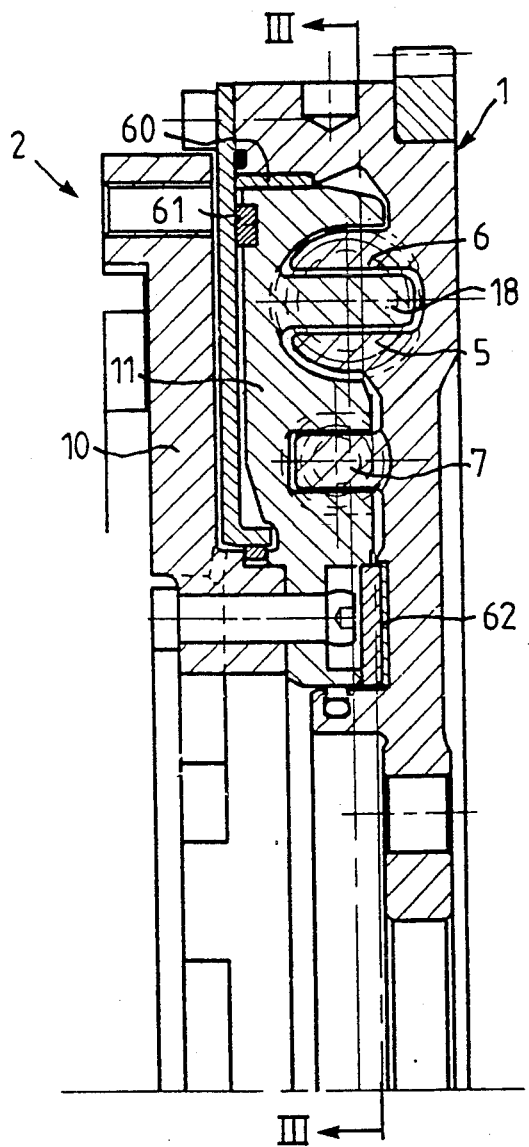
FIG. 3 shows a longitudinal section through a second embodiment.
Figure 4:
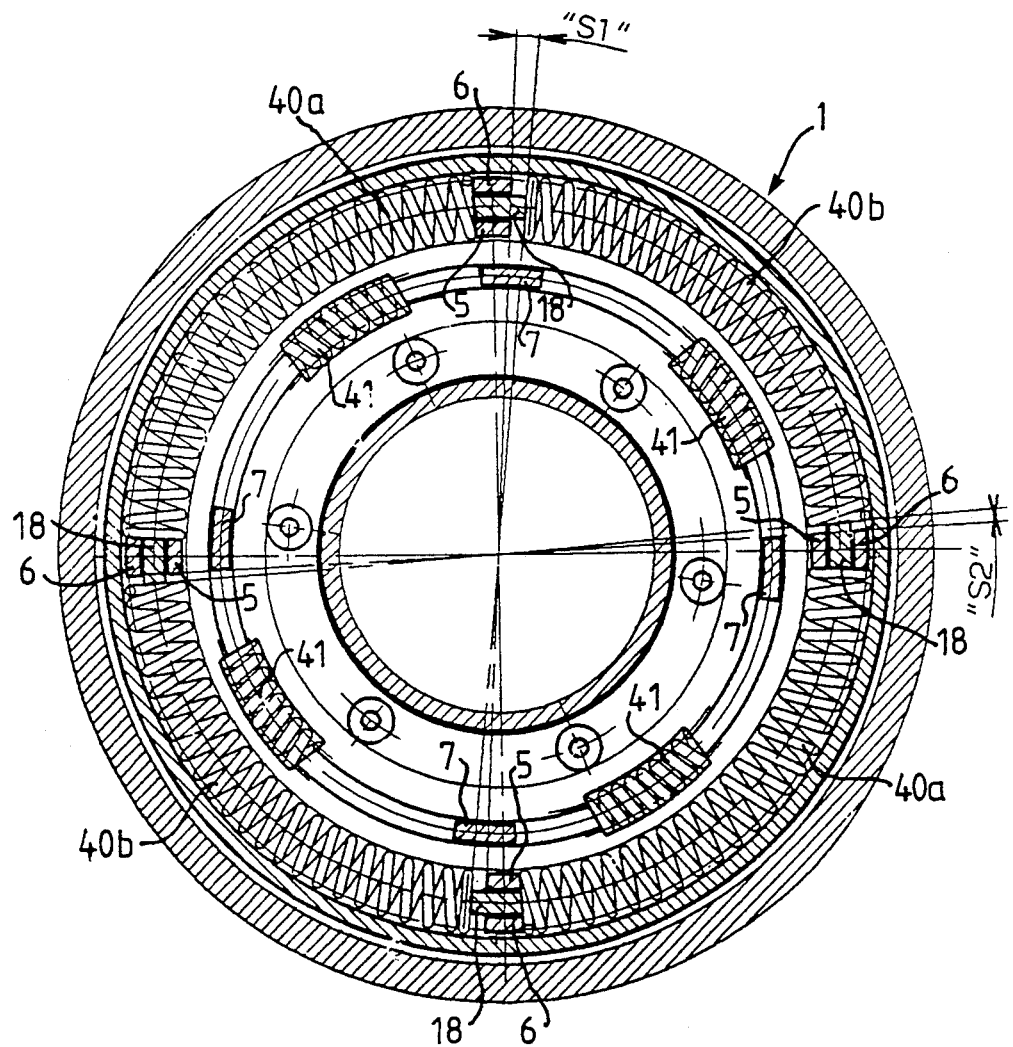
FIG. 4 shows a cross-section along the line III—III in FIG. 3.
Figure 5:
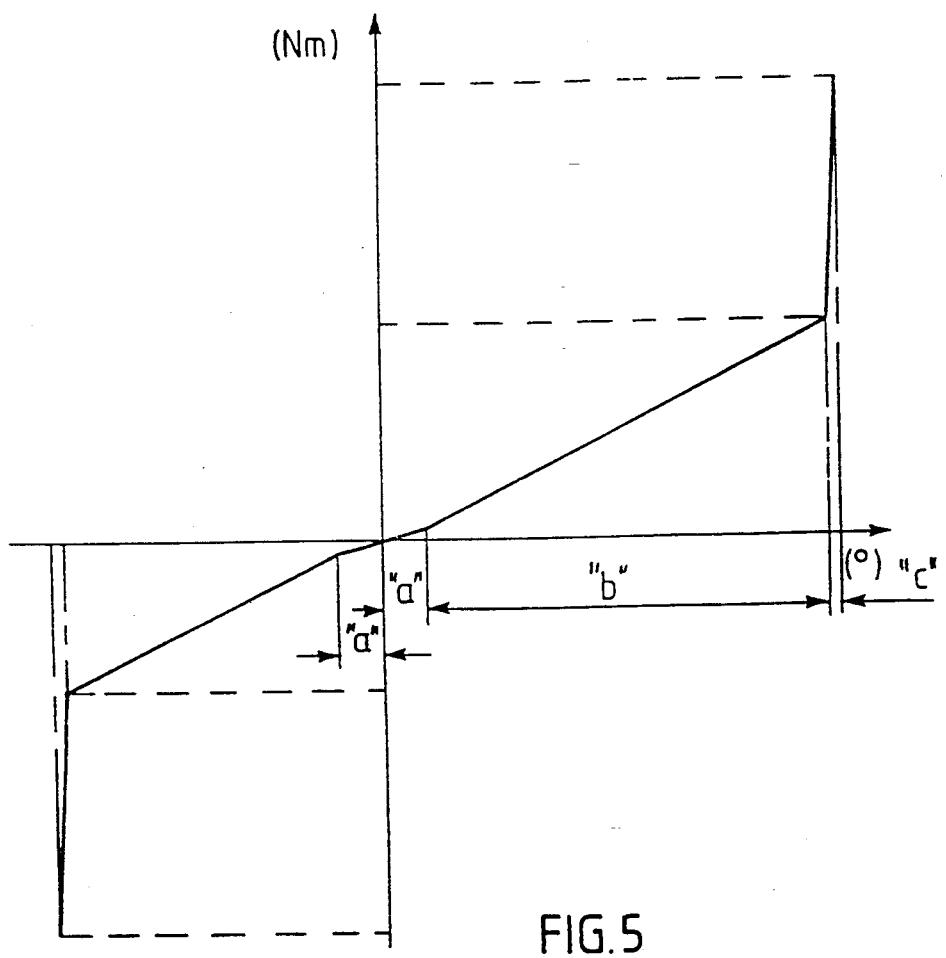
FIG. 5 is a diagram showing the spring characteristic of the device in FIGS. 3 and 4.

FIGS. 3 and 4 show a modified embodiment of the device according to the invention which distinguishes from the embodiment described above essentially in that the fingers 18 have a peripheral dimension which is larger than that of the fingers 5,6 and in that the ring 30 has been deleted. Components with counterparts in FIGS. 1 and 2 have the same reference numerals as in FIGS. 1 and 2. The fingers 18 and the pair of fingers 5,6 in each group are, as is evident from FIG. 4, arranged in relation to each other in the torque-unloaded state of the device, so that all three abut on one side against an adjacent spring end, while only the finger 18 abuts against the spring end on the opposite side. There is here instead a play "S1" or "S2" between the spring end and the adjacent fingers 5,6. These plays "S1" and "S2" are adapted to the spring force so that at idle only the springs 40a are compressed. The plays "S1" and "S2" in the embodiment shown are different, so as to compensate for the one-sided action of the springs, caused by the rotation of the flywheel in only one direction. These plays can, however, be equal in the torque-unloaded state. When the relative rotation of the masses exceeds the plays, the springs 40b are actuated, and this occurs during normal driving and during engine braking. The spring system has the characteristic shown in FIG. 5, where the range "a" illustration operation at idle with only the springs 40a being active. At normal operation, the spring system has the characteristic shown in range "b". At maximum torque the springs 41 are also brought into play, as illustrated by the characteristic in the range "c".

I claim:

1. Flywheel device for internal combustion engines comprising a first flywheel mass adapted to be connected to an output shaft from the engine, a second flywheel mass adapted to be coupled via a friction coupling to an input shaft of a transmission, said first and second masses being movable relative to each other in the direction of rotation, and spring means acting between said masses for transmitting torques between said masses, wherein the masses (1, 2) delimit together at least one cavity (17) curved in a circular arc in the direction of rotation, in which cavity said spring means in the form of helical spring means (40) are disposed, the masses having first and second abutments (5, 6, 18) axially projecting into the cavity, which abutments, in the torque-unloaded state of the masses, form supports for ends of said helical spring means lying on either side of the abutments and which, when there is torque-loading with relative rotation between the masses, are displaced in opposite directions to each other to compress said spring means, and wherein the first mass (1), adjacent its outer periphery, has a flange portion (50) axially projecting over at least a portion of the second mass (2), said flange portion being so dimensioned that a gap is formed between an inner cylindrical surface (50a) on said flange portion and an outer cylindrical surface on said second mass (2), and a bearing ring (60) disposed in said gap.

2. Device according to claim 1, wherein said first abutment is formed by a finger (18) made in one piece with said second said mass (2), while said second abutment is formed by a pair of fingers (5,6) formed in one piece with the first said mass (1), said pair of fingers (5,6) being so spaced radially to each other relative to the radial dimension of the first finger, that the first finger can pass between the two other fingers upon relative rotation between the masses.

3. Device according to claim 2, wherein said circle-arcuately curved cavity (17) has an essentially circular cross-sectional profile and said fingers (5,6,18) are so formed that said fingers (5,6,18), when the masses are not subjected to torque, fill out at least essentially the entire cavity between facing ends of said spring means (40).

4. Device according to claim 2 wherein said fingers (5,6,18) are cast in one piece with the first and second masses said (1,2) and are machined in a lathe to the same curvature as said circle-arcuate cavity (17).

5. Device according to claim 2, wherein first and second fingers (18;5,6) in each said group have different peripheral dimensions and are arranged relative to said helical spring means (40a,40b) arranged therebetween so that initial relative rotation between said masses (1,2) from the torque-unloaded state results in a compression of only one said spring means (40a).

6. Device according to claim 5, wherein four groups of said first and second fingers (18;5,6) with different peripheral dimensions are provided and two pairs said spring means (40a,40b) are grouped so that said initial relative rotation leads to a compression of diametrically opposite said spring means.

7. Device according to claim 5, wherein the first abutment (18) has a larger peripheral dimension than the second abutment (5, 6) and, in the torque-unloaded state of the masses, said spring means (40a) on one side of each abutment group abut against both abutments, while said spring means (40b) on the opposite side abut against only said first abutment.

8. Device according to claim 1, further comprising additional helical spring means (41), being arranged between said masses (1,2) in additional cavities (22) radially inside said one cavity (17) and these additional helical spring means are so fixed relative to one mass in relation to cooperating third abutments (7) on the other mass, that after a certain relative rotation between the masses, the last mentioned abutments come into contact with the spring means.

9. Device according to claim 1, wherein at least two groups of said abutments (5, 6, 18) project into said cavity and said helical spring means (40) fill out sections of said cavity between said groups of abutments when the masses are not subjected to torque.

10. Device according to claim 1, wherein an annular element (30) rotatably journalled on one of said masses, has projections radially (32) engaging with said spring means (40) for balancing centrifugal and reaction forces acting on said spring means.

* * * * *